Aug. 31, 1965
K. F. SCHOCH
3,203,628
CRYOGENIC FLUID VALVE
Filed April 16, 1963
3 Sheets-Sheet 1
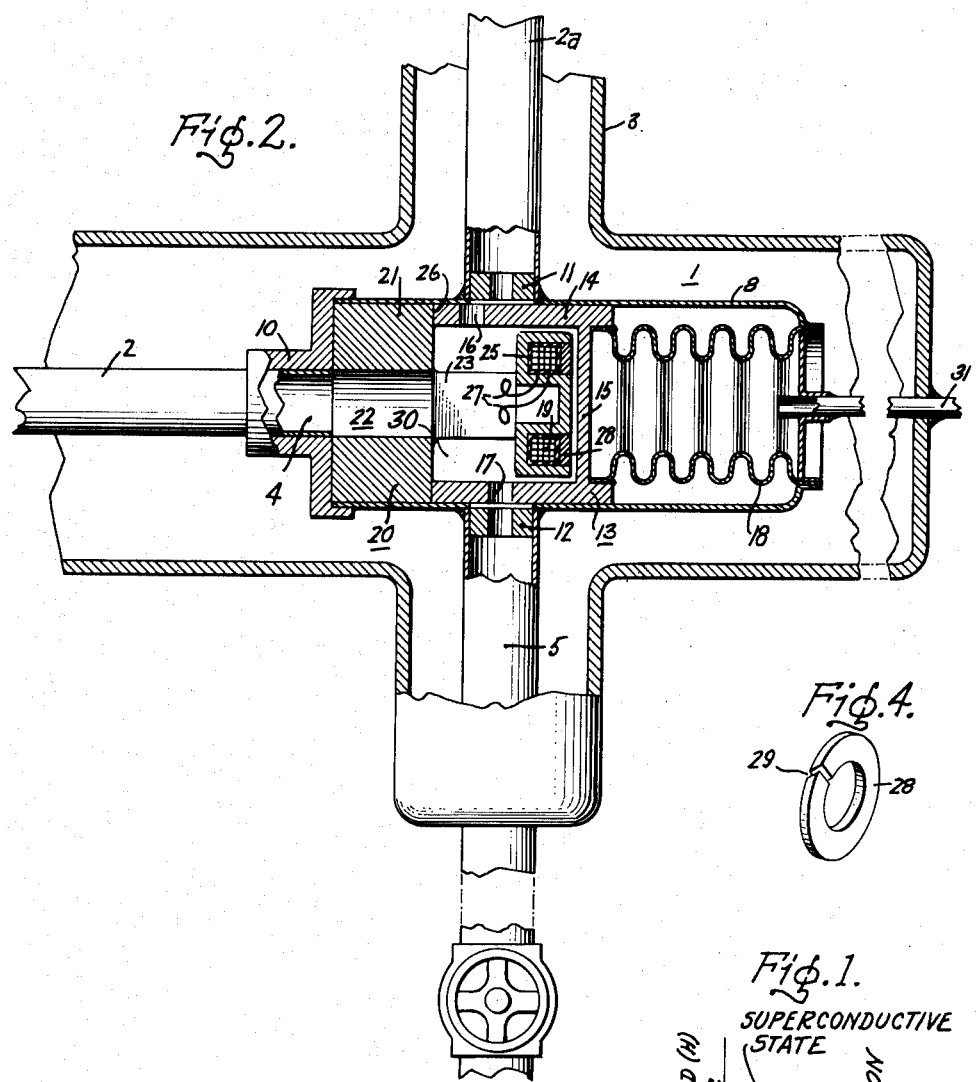
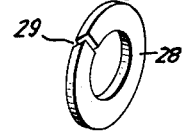
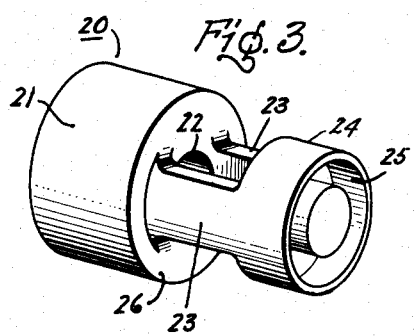
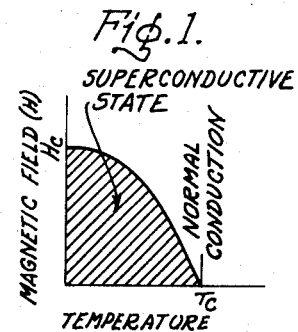
Inventor
Karl F. Schoch
by Paul A. Frank
His Attorney Inventor
Karl F. Schoch
by Paul A. Frank
His Attorney Aug. 31, 1965    K. F. SCHOCH    3,203,628
CRYOGENIC FLUID VALVE
Filed April 16, 1963    3 Sheets-Sheet 3
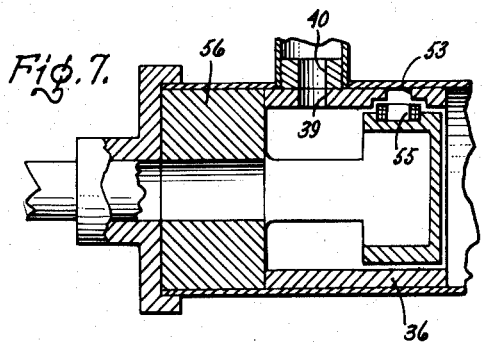
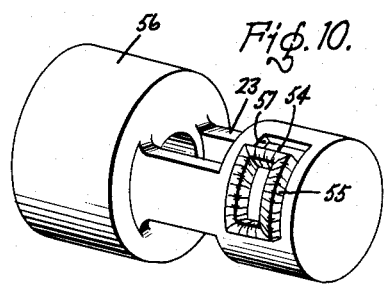
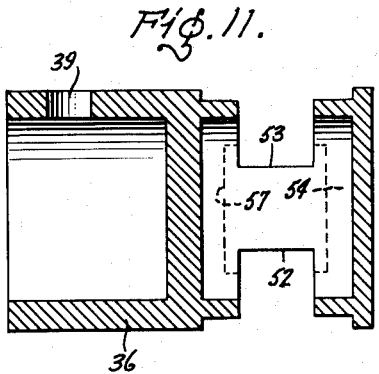
Inventor
Karl F. Schoch
by Paul A. Frank
His Attorney United States Patent Office 3,203,628
Patented Aug. 31, 1965

3,203,628
CRYOGENIC FLUID VALVE
Karl F. Schoch, Scotia, N.Y., assignor to General Electric Company, a corporation of New York
Filed Apr. 16, 1963, Ser. No. 273,447
14 Claims. (Cl. 236—75)

This invention relates to electro-magnetically operated valves and, more particularly, to such valves employed to control the flow of cryogenic fluids.

Cryogenic fluids are being used today to produce and maintain extremely low temperatures in many fields such as in missile fuels, separation and purification of gases, solid-state memory and switching devices, solid-state amplifiers, and oxygen-breathing apparatus for crews of high-altitude, long-range aircraft, just to mention a few.

Of particular interest is the use of cryogenic fluids for producing the state of superconductivity in those metals, alloys, or chemical compounds capable of achieving such a state. To produce and maintain superconductivity, constant refrigeration at temperatures near absolute zero is required, the refrigeration being obtained by the employment of liquefied gases such as helium or hydrogen. Due to thermal losses, the superconductive state may be maintained for only a relatively short period before additional cryogenic liquid is needed. However, on adding additional liquid to the system it is mandatory to prevent relatively warm vaporized gas from entering the system as this will add heat and possibly raise the temperature to a point where superconductivity will be lost. In order to prevent such an occurrence, it is necessary to pre-cool the transfer line and this may be accomplished by forcing cryogenic fluid through the transfer line until the line is sufficiently cool to allow cryogenic liquid to pass completely through the line from the fluid reservoir to the point of application without vaporizing. During the transfer line cool-down period, it is necessary to bypass the warm vaporized gas from the transfer line before it enters the system in which the cryogenic liquid is used.

The use of conventional valves for performing this function, that is, for directing the flow of cryogenic fluid, encounters many problems due to the extremely low temperatures involved. In order to use a conventional valve, the valve must be well insulated and free from any conditions, such as frost or ice formation, which would cause binding. It is also desirable to have a valve which can be remotely controlled or which can operate automatically upon the achieving of desired conditions of proper temperature and absence of vapor.

Accordingly, it is the object of this invention to provide an improved valve capable of handling cryogenic fluids.

Another object of this invention is to provide a valve capable of bypassing vaporized cryogenic fluid from a main flow line.

A further object of this invention is to provide a valve, capable of handling cryogenic fluid, which can be remotely controlled.

A still further object of this invention is to provide a valve, capable of handling cryogenic fluid, which bypasses vaporized cryogenic fluid until a predetermined condition is established at which time the valve automatically directs the incoming fluid to its point of utilization.

Further objects and advantages of this invention will be better understood from the following description referring to the accompanying drawings and the features of novelty which characterize this invention will be pointed out with particularity in the claims annexed to and forming part of this specification.

In the drawings:

FIGURE 1 illustrates the superconductive state in the magnetic field-temperature plane.

FIGURE 2 illustrates a cross-sectional view of a reciprocating valve employing the present invention.

FIGURE 3 is a perspective view showing a coil holder for a reciprocating valve.

FIGURE 4 is a perspective view showing a superconductive ring to be placed in the annular cavity of the coil holder.

FIGURE 7 is a cross-sectional view of a rotary superconductive sleeve illustrating a coil-receiving groove.

FIGURE 10 is a perspective view of a rotary valve using an internally located coil and employing the present invention.

FIGURE 11 is a cross-sectional view showing a coil holder for a rotary valve.

Figure 5:
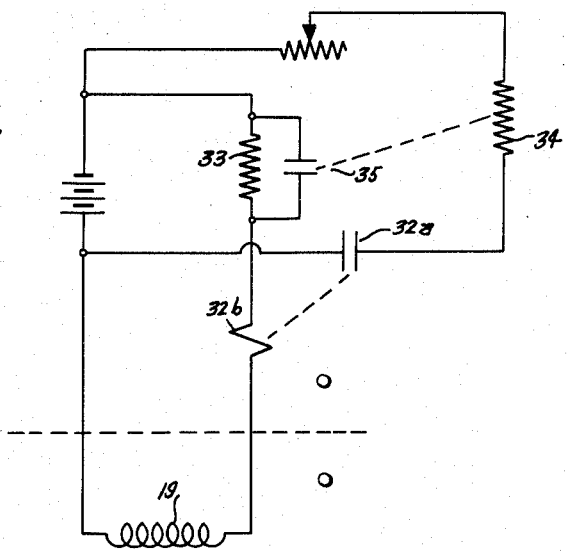
FIGURE 5 illustrates a time delay circuit for automatic operation of a superconductive valve.
Figure 6:
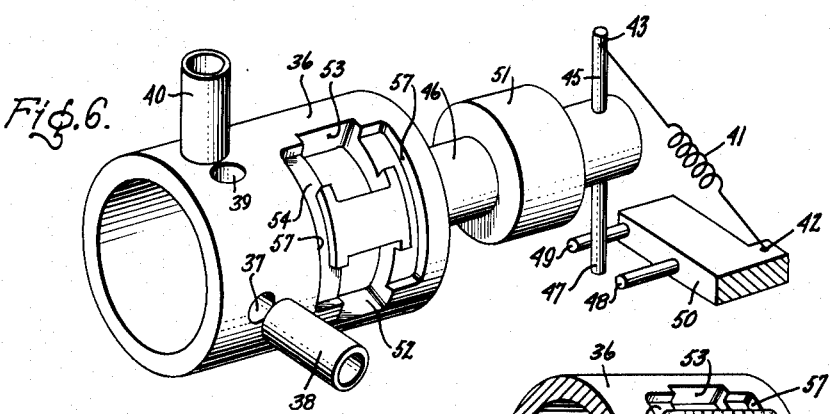
FIGURE 6 is a perspective view of a rotary superconductive valve.
Figure 9:
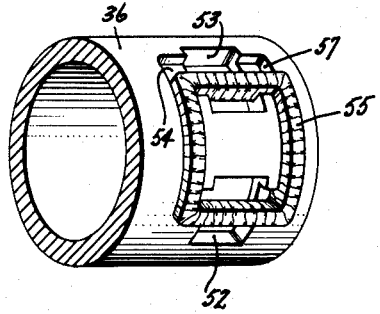
FIGURE 9 is a perspective view of a rotary superconductive sleeve and an externally located coil illustrating their relative position when in the transfer position.

In accordance with one embodiment of this invention, the superconductive characteristics of certain materials are utilized to actuate a valve through which cryogenic fluid flows. As long as the temperature of the valve is above a predetermined critical point, the incoming cryogenic fluid is bypassed from the main flow line into a vent system, thus preventing relatively warm vaporized fluid from entering into the area where a cryogenic liquid is needed. The passing of the fluid through the valve, however, reduces the temperature of the flow line and valve and, upon the occurrence of a valve temperature equal to or below a predetermined value, at which value incoming fluid remains in a liquid state, the incoming fluid is directed to its point of application.

The term "superconductve state" or "superconductive condition," as used throughout the specification and claims, denotes a condition of immeasurably small electrical resistivity and magnetic permeability. The term "superconductive" when used as an adjective to describe various parts of the valve, such as a superconductive sleeve, refers to characteristics of a member by which it is capable of exhibiting superconductive properties upon exposure to certain conditions of the magnetic field at the surface of the material and certain conditions of temperature. The superconductive state of a material exists for temperatures less than the transition temperature $T_c$ and for magnetic fields less than the critical field $H_c$ as shown in FIGURE 1. A listing of known superconductive elements and compounds along with their respective critical values (temperature and magnetic field) may be found in McGraw-Hill Encyclopedia of Science and Technology (1960), volume 13, page 296.

It should also be noted that the term "superconductive material" includes not only solid members which are wholly comprised of material possessing this unique characteristic, but also includes members that may be comprised of non-superconductive materials, such as copper or iron, provided with an outer thin layer or coating of superconductive material. For instance, a common inexpensive material may be used to construct the bulk of the "superconductive" member so long as it is coated with a thin layer of superconductive material. Since one of the unique characteristics of the superconductive material is that electrical current flows very close to the surface, an extremely thin outer layer of superconductive material provides the necessary path of infinite conductivity and infinite magnetic reluctance. Actual measurement has shown that this layer in most instances need be no thicker than one ten-thousandth (.0001) of an inch, since substantially no current flow penetrates further than this into the surface. It should be obvious that thicker layers may also be applied.

Referring now to the drawings, and particularly FIGURE 2, a valve 1 is shown located within a transfer line 2—2a, the transfer line being surrounded by a vacuum insulation jacket 3. Cryogenic fluid entering valve 1 through an inlet 4 is directed by the valve to either a vent line 5 or transfer line 2a which leads to the point of application.

The valve comprises a housing 8 which is fixedly attached at one end to the transfer line or fluid supply duct 2 as by a flanged coupling 10. A pair of exhaust ports 11 and 12 extend through the housing with one port 11 serving as an outlet port permitting the fluid to pass from valve 1 into transfer line 2a while the other port 12 serves as a vent port permitting the fluid and vapor to pass from valve 1 into vent line 5. The use of the term "port" is intended to broadly include any passageway and should not be limited to a well defined orifice or opening. As shown in FIGURE 2, the two exhaust ports 11, 12 are circumferentially spaced from and, more specifically, diametrically opposed to one another. It should be understood that they need not be so opposed so long as there is a spaced relationship between them.

Slidably mounted within the housing is a generally cup-shaped superconductive sleeve 13 having cylindrical side walls 14 and a transverse end wall or portion 15 on the end of the sleeve farthest from inlet 4 of the housing. A pair of ports 16 and 17 pass through the sleeve and serve as an outlet port and a vent port respectively. These ports are axially aligned with the corresponding housing outlet and vent ports 11 and 12. The sleeve outlet and vent ports 16 and 17 are spaced axially such that only one of these ports can be radially aligned with its corresponding housing port at any one time. As illustrated in FIGURE 2, in the normally de-energized state, the sleeve and housing vent ports 17 and 12 are radially aligned while the sleeve and housing outlet ports 16 and 11 are radially out of alignment.

A resilient biasing member such as a bellows 18 acting upon the outer side of the transverse wall 15 is employed to urge the sleeve in a normally closed position with respect to the outlet ports and in a normally open position with respect to the vent ports.

Located within the sleeve and disposed adjacent the transverse wall 15 is a superconductive coil 19 held in place by a holder 20. The holder 20 (FIGURE 3) consists of a cylindrical portion 21 having a bore 22 therethrough and a projecting portion. The projecting portion comprises extensions or arms 23 and a cylindrical portion 24 having an annular cavity 25 therein, the face of the cavity being adjacent the transverse wall 15 of the sleeve 13. The outer diameter of the cylindrical portion 21 of the holder is equal to the inside diameter of the housing so that by placing the holder such that the cylindrical portion 21 lies between the inlet flange 10 and the sleeve 13 the end of the sleeve will abut the inner face 26 of the cylindrical portion 21, the inner face serving as a stop means.

Leads 27 to the valve coil 19 may be brought out through the ends of the transfer line 2 or through properly sealed portions (not shown) of the vacuum insulation surrounding the transfer line.

As mentioned earlier, one of the properties of a superconductive material is that it has substantially infinite magnetic reluctance, that is, it is impenetrable by a magnetic flux. Consequently, directing a magnetic field against such a magnetic insulator will produce a magnetic pressure force against the insulator. In the subject valve, energization of coil 19 produces a magnetic flux directed at sleeve 13 and particularly directed at the sleeve's transverse wall 15. The resultant magnetic force tends to force the sleeve to slide to the right in FIGURE 2, thus moving vent ports 17 and 12 out of radial alignment while radially aligning sleeve and housing outlet ports 16 and 11. This operation provides a flow path from the cryogenic liquid reservoir directly to its point of utilization and closes the system's vent ports.

Coil holder 20 is preferably made of a magnetic material in order to increase the valve's efficiency by conserving the number of ampere turns since a magnetic material inherently has a low reluctance. Another way to increase the efficiency of the system is to use a superconductive coil because one of the properties of superconduction is an infinitely small resistance, thus, resulting in immeasurably small resistance losses. While it is preferable to have a magnetic holder and a superconductive coil, it should be noted that a non-magnetic holder and a non-superconductive coil could be used to produce the same results, albeit less efficiently.

A third method for increasing the efficiency of the valve is to place a thin superconductive ring 28 within the annular cavity 25 in the holder 20, the ring to be placed between the coil 19 and the transverse wall 15. A narrow radial slot 29 is cut axially through the ring 28. The purpose of the ring is to direct and concentrate the magnetic flux against the transverse wall 15, resulting in an increase in the efficiency of operation. This concentration is effectuated by the magnetic impermeability of superconductive material. When the ring is in a superconductive state, magnetic flux from the coil can enter the center of the ring only through slot 29 producing the directing and concentrating effect of the magnetic flux lines throughout the entire ring 28 and thus increase the thrust of coil 19. Slot 29 is also necessary to prevent induction of circulating current around ring 28 when coil 19 is first energized. While the ring is not essential for operation of the valve, the use of the ring significantly increases the efficiency.

When it is desired to admit cryogenic liquid to its point of application, the cryogenic fluid is supplied to supply duct 2 and enters superconductive valve 1. Because of lack of exposure of the valve and transfer line to cryogenic temperatures during the period prior to admittance of the fluid to the line, and due to conduction of surrounding ambient heat, the transfer line and valve will be at a temperature sufficiently high to vaporize the incoming cryogenic liquid. At the same time, the "superconductive" members of the valve i.e., sleeve 13 and ring 28, are in their non-superconductive state and remain so until the temperature of the valve and transfer line has decreased to a point equal to or below the critical temperatures of these materials, at which time they become superconductive. Prior to attaining these extremely low temperatures, a portion of the incoming cryogenic liquid vaporizes and, due to the normal position of the valve in which the sleeve and housing vent ports 17 and 12 are radially aligned, the mixture of cryogenic liquid and vapor passes inwardly through valve inlet 4 to interior valve cavity 30, out through sleeve and housing vent ports 17 and 12 and into vent line 5.

The sleeve 13, coil 19, and ring 28 remain resistive until the incoming cryogenic fluid reduces their temperature below the superconductive transition point. At that time a sudden drop in the resistance of these members provides an indication that the fluid may then be directed to the transfer line 2a and eventually to its point of application. The observation of the transition point may be accomplished by use of one of many types of resistance monitors (not shown) such as a bridge or voltmeter electrically connected to the superconductive members, for example, by using the leads 27 of the superconductive coil 19. Voltage probes (not shown) could also be placed across the coil to indicate the sudden drop in voltage. After a small delay to permit the temperature of the valve and line to drop slightly below the transition point, coil 19 is energized and the flux produced by the coil forces sleeve 13 to slide to the right in opposition to the urging of bellows 18, thus closing vent ports 17 and 12 while radially aligning outlet ports 16 and 11. Upon energization of the coil the magnetic flux must remain below the critical value $H_c$, this value being dependent upon the particular superconductive material utilized, since a flux in excess of this value will cause the material to return to its resistive or non-superconductive state.

The coil can be manually energized or it can be automatically energized by using a signal produced by the sudden drop in resistance to trigger a coil-energizing circuit. If an automatic system is to be used, a delay may be built into the circuit to permit the temperature to drop below the transition point, otherwise the production of a small magnetic field and a concomitant production of a small quantity of heat could raise the temperature sufficiently to switch the superconductive members back into their resistive state.

In the delay circuit illustrated in FIGURE 5, an extremely small current, insufficient to close relay contacts 32a, flows through coil 19 which is in a non-superconductive state. When the coil reaches the superconductive state, the current through a relay coil 32b will increase sufficiently to close relay contacts 32a but, due to the flow through resistor 33, the current is still insufficient to generate a magnetic field large enough to move the sleeve 13. Closing of relay contacts 32a permits current to flow through a heater 34 which, upon the attainment of a predetermined temperature, actuates a thermally responsive switch 35. Switch 35 shunts resistor 33 and, when closed, permits current to bypass the resistor resulting in an increase in current through coil 19 generating sufficient flux to actuate sleeve 13.

When it is desired to stop the flow of cryogenic fluid, coil 19 is de-energized and resilient bellows 18 forces sleeve 13 to return to its normal position whereby outlet ports 16 and 11 of the sleeve and housing respectively are non-aligned. At this time a valve (not shown) at the outlet of the cryogenic fluid reservoir is closed.

In the event of a sudden rise in pressure in the transfer line 2 or at the point of utilization of the cryogenic liquid, the valve may be de-energized rapidly to prevent possible rupture of the system. This control can be accomplished by a pressure-responsive switch (not shown) located in the transfer line calibrated to open the coil circuit when the pressure in the line exceeds a predetermined value. Another pressure safeguard involving direct mechanical control of the valve can be obtained by communicating the pressure to the inside of the bellows, as through a pipe 31. In the event of the occurrence of pressure in excess of a predetermined value, this pressure is sufficient to overcome the magnetic force maintaining the valve in its open position and, thus, the sleeve is forced to slide towards its normal position placing outlet ports 16 and 11 out of radial alignment while aligning vent ports 17 and 12.

An alternative construction of a superconductive valve which employs a rotary sleeve 36 rather than a reciprocating sleeve is illustrated in FIGURES 6–9. The rotary sleeve 36 shifts between an initial or venting position where a vent port 37 is in alignment with a vent line 38 while an outlet port 39 is out of alignment with a transfer line 40 to a final or transfer position where outlet port 39 is in alignment with transfer line 40 while vent port 37 is out of alignment with vent line 38. Sleeve 36 is normally maintained in its venting position by means of a tension spring 41 fixedly attached at one end 42 to a stationary member such as a valve housing and eccentrically fixedly attached at its other end 43 to the valve sleeve or to a member rigidly connected with the valve sleeve. In the illustrated embodiment, the spring is attached to one end 44 of a projection 45 which protrudes through an extension rod 46 of the sleeve. The other end 47 of the projection 45 serves as a stop means and is disposed between a pair of extensions 48, 49 which extend from a stop member 50. A bearing support 51 for the rotary sleeve may operate in conjunction with the extension rod 46.

In order to provide an abutment against which a generated magnetic force may react, a pair of spaced rotor slots 52, 53 extend through sleeve 36. The rotor slots 52, 53 have a sufficient circumferential dimension to permit a groove 54 (FIGURES 7 and 8) to be cut in the outer surface of the sleeve and to traverse the slots axially. The groove 54 partially receives a superconductive coil 55 which is fixedly attached to the valve housing (not shown). As illustrated in FIGURES 10 and 11, the groove may be cut in the interior surface of the sleeve and the coil supported therein by a holder 56. The circumferential width of the longitudinal legs 57 of groove 54 exceed in width the corresponding width of the coil 55 so that relative motion may take place between the sleeve and the coil.

Figure 8:
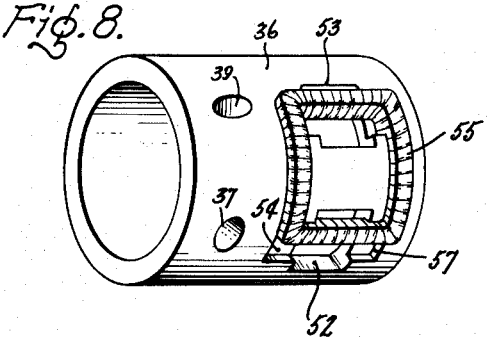
FIGURE 8 is a perspective view of a rotary superconductive sleeve and an externally located coil illustrating their relative position when in the venting position.

When the sleeve is in its normally vented position, coil 55 is located within the groove 54 in an off center position with respect to rotor slots 52, 53 as may be seen in FIGURE 8. Upon energization of the coil, the generated flux entering the rotor slots produces a torque on the sleeve which causes the sleeve to rotate and align outlet port 39 with transfer line 40 and to center the coil with respect to the rotor slots at which time the magnetic force on the walls of the slot is symmetrical resulting in the diminution of the torque. Abutment of the projection 45 against the extension 48 protruding from the stop member 50 prevents the sleeve from rotating past the center position as it would normally tend to do due to its inertia. Upon de-energization of the coil, the tension spring returns the sleeve to its normally vented position, at which time the projection 45 abuts the stop member extension 49 to prevent the sleeve from rotating past the venting position.

While the specific forms and methods of this invention have been shown and described, it will be apparent to those skilled in the art that numerous changes, combinations and substitutions of equivalents might be made. For example, as shown in FIGURE 2 and stated above, housing outlet port 11 and vent port 12 are diametrically opposed. However, any circumferential or axial displacement would suffice to produce the desired results provided similar displacements occur in the sleeve ports. It should be obvious that a single port in the sleeve selectively moving from a vent port to an outlet port in the housing could produce similar results.

Similarly, it should be obvious that the valve operating means can be used on a simple on-off valve which does not have the venting feature. If this type of valve is desired, only a single port is needed in the sleeve and housing.

It is, therefore, contemplated by the claims which conclude this specification to cover all such modifications as fall within the true spirit and scope of this invention.

What I claim as new and desire to secure by Letters Patent of the United States is:

1. A cryogenic fluid valve comprising:
   a housing adapted to receive a cryogenic fluid, said housing having a first outlet port therein,
   valve means including a portion of superconductive material movably mounted within said housing, said valve means having a second outlet port therein,
   biasing means urging said first and second outlets out of alignment,
   magnetic flux generating means adjacent said valve means, and
   means for energizing said magnetic flux generating means to repel said portion of superconductive material for moving said valve means to effect alignment of said outlet ports when cryogenic fluid causes a sufficient reduction in temperature of said valve means to place said valve means in a superconductive state.

2. A cryogenic fluid valve comprising:
   a housing adapted to receive a cryogenic fluid, said housing having a first outlet port and a vent port spaced from said first outlet port, valve means including a portion of superconductive material movably mounted within said housing, said valve means having a second outlet port extending therethrough, biasing means urging said second outlet port and said vent port in communicating relationship, magnetic flux generating means within said valve means, and means for energizing said magnetic flux generating means for repelling said portion to move said valve means for effecting alignment of said first and second outlet ports when cryogenic fluid causes a sufficient reduction in temperature of said valve means to place said valve means in a superconductive state.

3. A cryogenic fluid valve as defined in claim 2 wherein said magnetic flux generating means comprises a coil of superconductive material.

4. A valve for cryogenic fluids comprising:

a housing adapted to receive a cryogenic fluid, said housing having a first outlet port and a first vent port spaced from said first outlet port, a sleeve including a transverse portion of superconductive material movably mounted within said housing, said sleeve having a second outlet port extending therethrough, a resilient member biasing said sleeve such that said second outlet port is in communicating relationship with said first port, a holder connected to said housing, said holder having receiving means thereon, a superconductive coil supported by said receiving means, and means for energizing said superconductive coil for repelling said transverse portion of said sleeve to cause movement of said sleeve to effect alignment of said first and second outlet ports when cryogenic fluid causes a sufficient reduction in temperature of said sleeve and coil to place them in a superconductive state.

5. A valve for cryogenic fluids comprising:

a housing adapted to receive cryogenic fluid, said housing having a first outlet port and a first vent port spaced from said first outlet port, a sleeve movably mounted within said housing including a transverse portion superconductive material extending inwardly therefrom perpendicular to the direction of travel of said sleeve, said sleeve having a second outlet port and a second vent port spaced from said second outlet port such that only one of said second ports can be radially aligned with one of said first ports at any one time, a resilient member biasing said sleeve such that the first and second vent ports are in radial alignment while the first and second outlet ports are out of radial alignment, a holder of magnetic material within said housing, said holder having receiving means thereon, a coil of superconducting material supported by said receiving means, and means for energizing said coil for causing movement of said sleeve in a direction away from said coil by a repulsive effect to affect radial alignment of said first and second outlet ports when cryogenic fluid causes a sufficient reduction in temperature of said sleeve to place it in a superconductive state.

6. A cryogenic fluid valve comprising:

a hollow cylindrical housing adapted to receive a cryogenic fluid, said housing having a first outlet port and a first vent port extending therethrough, said first outlet port and said first vent port being circumferentially displaced from one another, a hollow, cylindrical, superconductive sleeve reciprocally mounted within said housing including an inwardly extending transverse portion perpendicular to the direction of travel of said sleeve within said housing, said sleeve having a second outlet port and a second vent port extending therethrough and in axial alignment with said first outlet port and said first vent port respectively, the second outlet port and the second vent port being axially displaced from one another such that only one of said second ports can be radially aligned with one of said first ports at any one time, a resilient member biasing said sleeve for normally maintaining said first and second vent ports in radial alignment and said first and second outlet ports out of radial alignment, a holder of magnetic material within said housing, said holder having receiving means thereon, a coil of superconductive material supported by said receiving means, and means for energizing said superconductive coil for causing movement of said sleeve in a repelling manner in a direction away from said coil by a force against said transverse portion to effect radial alignment of said first and second outlet ports when cryogenic fluid causes a sufficient reduction in temperature of said sleeve and coil to place them in a superconductive state.

7. A cryogenic fluid valve having superconductive ports comprising:

a hollow cylindrical housing having an inlet end adapted to receive a cryogenic fluid, said housing having a first outlet port and a first vent port extending therethrough, said first outlet port and said first vent port being circumferentially spaced from one another, a hollow, cylindrical sleeve reciprocally mounted within said housing, said sleeve having:

a transverse wall of superconductive material at the end thereof farthest from the housing inlet and extending in a direction perpendicular to the direction of travel of said sleeve, and a second outlet port and a second vent port extending therethrough and in axial alignment with said first outlet port and said first vent port respectively, the second outlet port and the second vent port being axially displaced from one another such that only one of said second ports can be radially aligned with one of said first ports at any one time, a hollow resilient member biasing said sleeve for normally maintaining the first and second vent ports in radial alignment and said first and second outlet ports out of radial alignment, a magnetic holder having a bore therethrough mounted within said housing, said holder having a projection extending within said sleeve, the end of said projection being adjacent the transverse wall of said sleeve and having an annular cavity therein, a superconductive coil mounted within said cavity, and electrical means for energizing said superconductive coil to cause a repelling force against said wall strong enough for causing movement of said sleeve to effect radial alignment of said first and second outlet ports when cryogenic fluid causes a sufficient reduction in temperature of said sleeve and coil to place them in a superconductive state.

8. A cryogenic fluid valve as defined in claim 7 including a ring of superconductive material mounted within said cavity between said coil and said transverse wall, the ring having a thin radial slot cut therethrough for concentrating and directing the magnetic flux at said transverse wall and to prevent induction of circulating current around the ring when said coil is first energized when the temperature of said ring is sufficiently low to place it in a superconductive state.

9. A cryogenic fluid valve having superconductive ports comprising:

a hollow cylindrical housing having an inlet and adapted to receive a cryogenic fluid, said housing having a first outlet port and a first vent port extending therethough, said first outlet port and said first vent port being circumferentially spaced from one another, a hollow cylindrical sleeve and including a section of superconductive material rotatably mounted within said housing, said sleeve having:

a slot therethrough, a second outlet port and a second vent port extending therethrough and in circumferential alignment with said first outlet port and said first vent port, the second outlet port and the second vent port being circumferentially displaced from one another such that only one of said second ports can be radially aligned with one of said first ports at any one time, and a coil receiving groove in the outer surface of said sleeve, a portion of said groove passing axially across said slot, a coil fixedly mounted on the inner surface of said housing and inserted within said groove, said groove having a circumferential width in excess of the circumferential width of said coil to allow relative rotational motion between said coil and said sleeve, a resilient member biasing said sleeve for normally maintaining the first and second vent ports in radial alignment and said first and second outlet ports out of radial alignment, and means for energizing said coil to cause a repelling force that results in rotation of said sleeve to effect radial alignment of said first and second outlet ports when cryogenic fluid causes a sufficient reduction in temperature of said sleeve to place it in a superconductive state.

10. A cryogenic fluid valve as defined in claim 9 including:

a stop member fixedly attached to said housing, said stop member comprising a pair of spaced extensions, and a projection extending from said sleeve and disposed between said extensions such that said projection abuts one of said extensions when said first and second vent ports are in radial alignment and said projection abuts the other of said extensions when said first and second outlet ports are in radial alignment.

11. A cryogenic fluid valve as defined in claim 9 wherein said coil is made of a superconductive material.

12. A cryogenic fluid valve comprising:

a hollow cylindrical housing adapted to receive a cryogenic fluid, said housing having a first outlet port and a first vent port extending therethrough, said first outlet port and said first vent port being circumferentially displaced from one another, a hollow cylindrical sleeve including the section of superconductive material rotatably mounted within said housing, said sleeve having:

a slot therethrough, a second outlet port and a second vent port extending therethrough and in circumferential alignment with said first outlet port and said first vent port, said outlet port and said second vent port being circumferentially displaced from one another such that only one of said second ports can be radially aligned with one of said first ports at any one time, and a coil receiving groove in the inner surface of said sleeve, a portion of said groove passing axially across said slot, a holder within said housing, said holder having a portion extending within said sleeve, said portion having receiving means thereon adjacent said groove, a coil fixedly supported by said receiving means and inserted within said groove, said groove having a circumferential width in excess of the circumferential width of said coil so as to allow relative rotational motion between said coil and said sleeve, a resilient member biasing said sleeve for normally maintaining said first and second vent ports in radial alignment and said first and second outlet ports out of radial alignment, and means for energizing said coil for causing a repelling force between said coil and said superconductive portion of said sleeve to result in movement of said sleeve to effect radial alignment of said first and second outlet ports when cryogenic fluid causes a sufficient reduction in temperature of said sleeve to place it in a superconductive state.

13. A cryogenic fluid valve as defined in claim 11 including:

a stop member fixedly attached to said housing, said stop member comprising a pair of spaced extensions, and a projection extending from said sleeve and disposed between said extensions such that said projection abuts one of said extensions when said first and second vent ports are in radial alignment and said projection abuts the other of said extensions when said first and second outlet ports are in radial alignment.

14. A cryogenic fluid valve as defined in claim 13 wherein:

said coil is made of a superconductive material, and said holder is made of magnetic material.

References Cited by the Examiner

UNITED STATES PATENTS

| | | | |
|---|---|---|---|
| 1,857,053 | 5/32 | Kratz | 251—140 X |
| 2,289,456 | 7/42 | Ray | 251—140 |
| 2,339,087 | 1/44 | Mantz. | |
| 2,491,905 | 12/49 | Ray. | |
| 2,637,343 | 5/53 | Matthews | 236—75 X |

OTHER REFERENCES

Gilmore, Ken: Cryogenics, Electronics at Ultralow Temperatures. In Electronics World, pp. 23–26, 84 and 85, July 1962 317–158.1.

Swartz et al.: Characteristics and a New Application of High-Field Superconductors. In Journal of Applied Physics, pgs. 2292–2300, July 1962.

WILLIAM F. O'DEA, *Primary Examiner.*

ALDEN D. STEWART, *Examiner.*